UNITED STATES PATENT OFFICE.

MARGARET SCHMITZ, OF TIPTON, MISSOURI.

COMPOSITION FOR COATING YEAST.

SPECIFICATION forming part of Letters Patent No. 725,370, dated April 14, 1903.

Application filed November 9, 1901. Serial No. 81,754. (Specimens.)

*To all whom it may concern:*

Be it known that I, MARGARET SCHMITZ, a citizen of the United States, residing at Tipton, in the county of Moniteau and State of Missouri, have invented a new and useful Composition of Matter to be Used for Preserving Compounds, of which the following is a specification.

This invention relates to preserving compounds.

The object of the invention is in a simple, thoroughly-feasible, inexpensive, and practical manner and without injury to the substance treated to render it proof against entrance of moisture, vermin, or spores or germs of fermentation or decay and to prevent formation of mold, the substance treated being thus rendered practically decay-proof for an indefinite period, the preservative employed being at once edible and nutritious, thereby rendering it unnecessary that it should be removed from the substance when the same is used.

With these and other objects in view, as will appear as the nature of the invention is better understood, the same consists in the novel preserving compound hereinafter fully described and claimed.

The compound consists of the following ingredients, by weight and measure, combined, substantially, in the following proportions: Table salt, nine parts; water, (soft,) thirty-two parts; flour, twenty-eight parts; corn-starch, one part. These ingredients are thoroughly mixed and then strained to remove any lumps that may be present and to present a soft and smooth pasty mass. In using the above compound the substances to be treated, such as compressed yeast or articles of food, are coated therewith, either by dipping or having it applied thereto with a brush.

By the employment of the above-described compound a firm air-tight coating or envelop is formed around the substance treated, rendering it impervious to entrance of vermin, moisture, or the like and preserving its freshness indefinitely.

Where yeast is treated with this compound, its rigidity is such that it may be handled and shipped without danger of breakage, and, further, the ingredients employed will add to its leavening qualities, and thus its value.

Having thus described the invention, what I claim is—

1. The herein-described edible preserving compound, consisting of table salt, water, flour, and corn-starch, substantially in the proportions specified.

2. The herein-described edible preserving compound consisting of table salt nine parts, soft water thirty-two parts, flour twenty-eight parts, corn-starch one part.

In testimony whereof I have signed my name to this specification in the presence of two subscribing witnesses.

MARGARET SCHMITZ.

Witnesses:
DON COOK,
JOHN H. SIMPSON.